Sept. 5, 1944.   G. T. LYON   2,357,748
METHOD OF AND APPARATUS FOR FLARING TUBES
Filed May 13, 1943
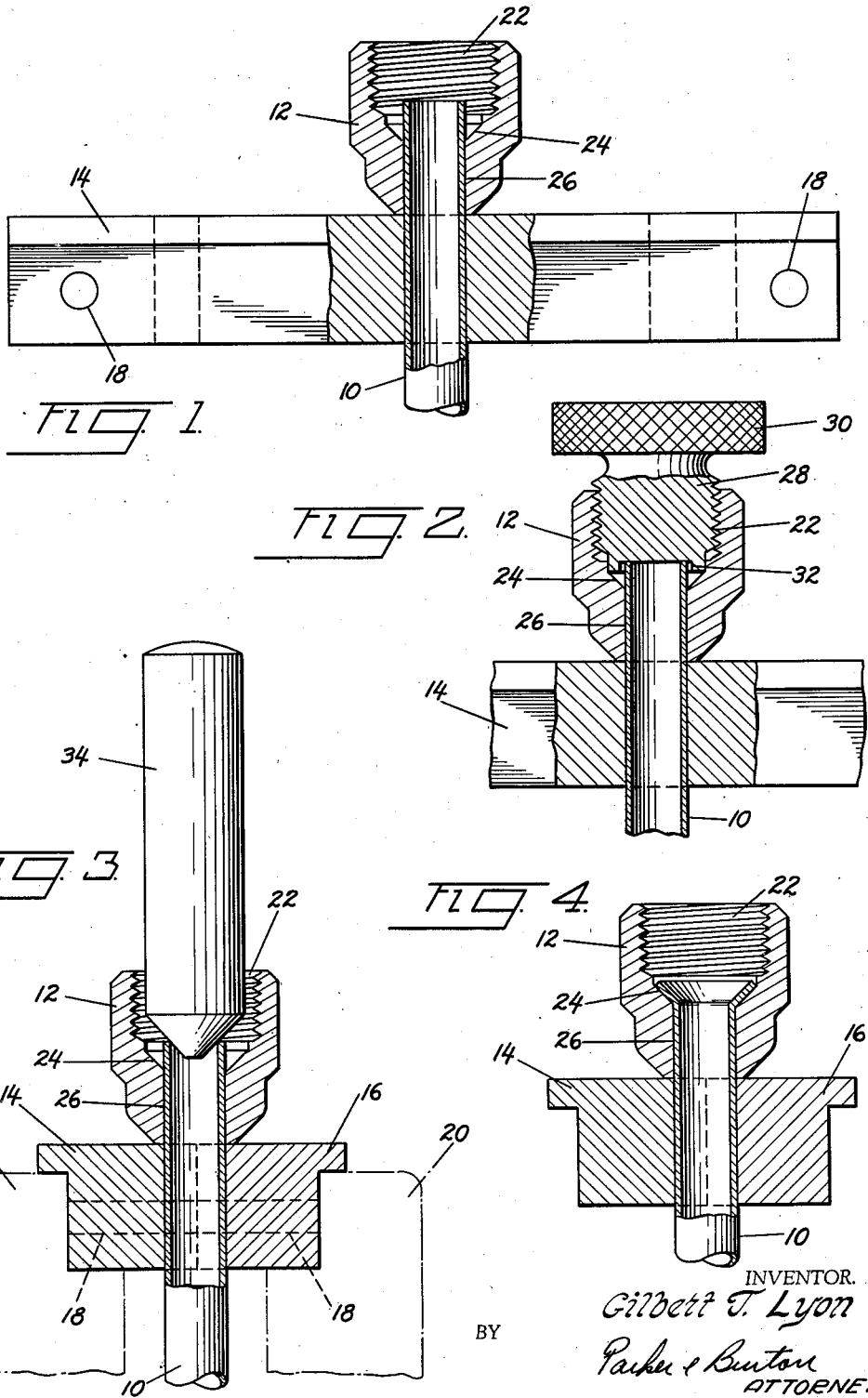
INVENTOR.
Gilbert T. Lyon
BY Parker & Burton
ATTORNEYS.

Patented Sept. 5, 1944

2,357,748

UNITED STATES PATENT OFFICE 2,357,748

METHOD OF AND APPARATUS FOR FLARING TUBES

Gilbert T. Lyon, Van Dyke, Mich.

Application May 13, 1943, Serial No. 486,770

2 Claims. (Cl. 153—79)

This invention relates to an improved method of and apparatus for flaring a metal tube within a coupling nut attached to the end of the tube. The invention resides primarily in gauging the amount of the tube required for the flare.

In fluid systems generally it is common practice to provide a female coupling nut on one end of the tube for attachment to a fitting or for attachment to another tube section. It is also common practice to flare the end of the tube which is inserted into the nut to secure the nut to the tube and to form a tight joint between the tube and the nut.

In accomplishing the above object a cup shaped nut having a tube aperture through the bottom of the nut and internally threaded adjacent to its opposite end is secured to one end of the tube to provide such a tube section with the proper female fitting. The nut is attached to the tube by inserting the end of the tube through the aperture in the bottom of the nut, and a flaring tool is then inserted through the nut into the end of the tube and such end of the tube is flared outwardly within the nut securing the nut thereto.

This invention has to do with an improved method of and means for accomplishing this result. Heretofore the end of the tube was inserted through the bottom of the nut a distance which was thought to be necessary to accomplish the proper flare and the flaring operation was then carried out.

I provide an improved method of and means for gauging the projection of the tube through the nut aperture in the bottom of the nut whereby the correct projection of tube into the nut may be quickly and accurately determined and accomplished so that when the flaring operation is performed the exact amount of tube projection required will be flared over into the interior of the nut.

Through my invention the correct length of tube is always flared over within the nut and the joint which is produced therebetween is the proper one and a secure tight fit is obtained at all times.

Other objects, advantages and meritorious features of this invention will more fully appear from the following description, appended claims and accompanying drawing wherein:

Fig. 1 is a vertical cross sectional view through a nut inserted over the end of a tube to which it is to be attached and showing the same before the gauging operation has been carried out.

Fig. 2 is a sectional view taken on the same line as Fig. 1 showing the gauge in position within the nut and the nut adjusted to the proper location on the tube.

Fig. 3 is a sectional view taken at right angles to the views of Figs. 1 and 2 showing the insertion of a flaring tool through the nut into the tube and at the beginning of the flaring operation.

Fig. 4 is an elevation of the end of the tube showing a nut in sectional view attached to the end of the tube and after the flaring operation has been completed.

In the practice which has heretofore been followed a nut such as that shown in the figures of the drawing is inserted over the end of a tube in the manner illustrated. The tube section is ordinarily supported between die block members, such as shown, and that amount of tube which is judged by the operator to be the required amount is allowed to project into the interior of the nut. A flaring tool is then inserted through the nut and into the end of the tube and the end of the tool is struck with a hammer to produce the proper flare. A difficulty with this method of operation was that if an insufficient length of tube were permitted to project into the nut the joint formed by the flaring operation might not be sufficient to properly retain the nut and to form a tight seal therewith. On the other hand if too great a length of tube were permitted to project into the interior of the nut, and a variation of $\frac{1}{32}$ of an inch was common, the tube when flared would obstruct the threads so that a tight connection might not result when the fitting was later attached to the nut coupling. With my invention herein disclosed accuracy is accomplished and the above disadvantages are eliminated.

I provide a tube one end of which is shown at 10 and a nut shown in cross section at 12. This tube may be in any desired suitable diameter. It is supported between a pair of cooperating die blocks 14 and 16. Pin apertures 18 are provided through the die blocks to receive supporting pins. These die blocks may be mounted within a vise or other suitable support such as shown in Fig. 3 where the jaws of the vise are indicated as at 20. These die blocks would be provided with registering passageways of different size so as to accommodate tubes of different diameters. The tube would be so supported between the clamping die blocks that one end of the tube would project therebeyond as shown in the figures of the drawing, and preferably this projection would be greater than that required to accomplish the flaring operation.

A nut 12 is then placed over the upwardly projecting end of the tube as shown in Fig. 1. In this figure the tube is shown as extending through the tube aperture in the bottom of the nut and into the interior of the nut to a height greater than that required for the flare. The nut is threaded internally as at 22 adjacent to its opposite end and this threaded portion terminates in a beveled shoulder 24 which leads to the tube aperture 26.

I provide a gauge which has a body, the intermediate portion of which is externally threaded as at 28. At one end this body is provided with a gripping portion here shown as a thumb gripping portion 30. At the opposite end this body is provided with a tube engaging part which is shown as recessed, as at 32, to receive the end of the tube. The gauge is threaded into the nut, as shown in Fig. 2, until the gauge seats against the beveled shoulder within the nut. If the tube has been projected into the nut to a distance greater than that required to accomplish the proper flare, as above described, the gauge will position the nut upon the tube with the proper length of tube projecting into the interior of the nut. As the gauge is threaded into the nut it will lift the nut on the tube to this proper position. One preferred method is to secure the tube loosely within the die blocks so that at the same time that the nut is positioned on the tube the tube is urged through the die blocks so that the nut rests thereupon. The engagement of the die blocks with the tube is sufficiently tight to support the tube but sufficiently loose to permit this relative movement.

On the other hand, the tube might be projected into the nut a distance less than that normally required and when the gauge is threaded to its seat within the nut the tube might then be elevated through the die blocks and relative to the nut until the end of the tube abuts the end of the gauge.

The gauge is then removed and a flaring tool, such as indicated at 34, is inserted through the nut and into the end of the tube. The end of the tube is flared in the usual manner by striking the impact end of the flaring tool. It has been found that a better flaring can be accomplished if a small flaring tool is first inserted and the flaring operation carried out in two steps, namley, by using, first, a small tool and, second, a slightly larger tool.

When the tube is secured to a nut through following out the above operation, and with the employment of my improved gauge, it will be found that an accurate, efficient, tight joint is provided between the tube and the nut.

What I claim is:

1. A gauge for determining the projection of a tube into a nut with which it is to be connected comprising a gauge body having an externally threaded portion intermediate its ends adapted to be threaded into the nut, said body provided with a gripping part at one end beyond the threaded portion, the opposite end of the body beyond the threaded portion having an end recess adapted to receive the end of a tube received within the nut, that portion of the body surrounding said recess adapted to seat within the nut to position the gauge.

2. That method of flaring a tube within a nut having an opening therethrough which opening is threaded at one end and has a portion of reduced diameter at the opposite end connected with the threaded portion by a tapered seat portion comprising mounting the tube within a support through which support it is adjustably slidable and with the end of the tube projecting beyond the support, placing the nut over the end of the tube to rest with its reduced diameter end upon the support and with the tube projecting into the interior of the nut through the reduced diameter end of the opening to a point within the threaded portion of the nut, screwing an externally threaded gauge having an end recess of a diameter to receive the end of the tube into the threaded end of the nut aperture to seat upon the end of the tube within the recess, continuing the screwing of the gauge with the nut advancing the tube ahead of the gauge until the end of the gauge seats against the tapered seat portion of the nut thereby adjusting the projection of the tube with respect to the tapered seat of the nut, removing the gauge, and flaring the end of the tube into engagement with the tapered seat portion of the nut opening,

GILBERT T. LYON.